United States Patent
Ulrich et al.

(10) Patent No.: US 6,517,921 B2
(45) Date of Patent: *Feb. 11, 2003

(54) LAMINATED CARD ASSEMBLY

(75) Inventors: Brett Ulrich, South Wales, NY (US);
Blaine Jackson, East Aurora, NY (US);
William Becker, Lockport, NY (US);
Omar Attia, Lakeview, NY (US);
André Saint, Tonawanda, NY (US)

(73) Assignee: Avery Dennison Corporation, Pasadena, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 09/730,089

(22) Filed: Dec. 5, 2000

(65) Prior Publication Data

US 2001/0014378 A1 Aug. 16, 2001

Related U.S. Application Data

(63) Continuation of application No. 08/882,966, filed on Jun. 26, 1997, now Pat. No. 6,159,570, which is a continuation-in-part of application No. 08/327,981, filed on Oct. 24, 1994, now Pat. No. 5,662,976.

(51) Int. Cl.[7] .............................................. B65D 65/28
(52) U.S. Cl. .......................... 428/40.1; 40/630; 40/633; 283/75; 283/109; 428/41.7; 428/41.8; 428/41.9; 428/42.1; 428/42.2; 428/42.3; 428/43; 428/914
(58) Field of Search ................................ 428/40.1, 41.7, 428/41.8, 41.9, 421, 42.2, 42.3, 43, 914; 283/109, 75; 40/630, 633

(56) References Cited

U.S. PATENT DOCUMENTS

| | | |
|---|---|---|
| 4,773,677 A | 9/1988 | Plasse |
| 5,058,926 A | 10/1991 | Drower |
| 5,096,229 A | 3/1992 | Carlson |
| 5,131,686 A * | 7/1992 | Carlson ........................ 283/75 |
| 5,171,039 A | 12/1992 | Dusek |
| 5,172,938 A | 12/1992 | Schmidt |
| 5,230,938 A | 7/1993 | Hess |
| 5,283,093 A | 2/1994 | All |
| 5,284,689 A | 2/1994 | Laurash |
| 5,318,326 A | 6/1994 | Garrison |
| 5,389,414 A | 2/1995 | Popat |
| 5,466,013 A | 11/1995 | Garrison |
| 5,509,693 A * | 4/1996 | Kohls ........................... 283/75 |
| 5,518,787 A | 5/1996 | Konkol |
| 5,653,472 A | 8/1997 | Huddleston et al. |
| 6,159,570 A * | 12/2000 | Ulrich ........................ 428/40.1 |

* cited by examiner

Primary Examiner—Nasser Ahmad
(74) Attorney, Agent, or Firm—Oppenheimer Wolff & Donnelly, LLP

(57) ABSTRACT

The present invention relates to an assembly which includes a display card-forming section and an identification card-forming section. The identification card-forming section includes a first backing sheet and contains an identification card backing region. Further included is a first adhesive layer, a first release layer joined to the first side of the backing sheet and to the first adhesive layer except at the identification card backing region where there is an opening in the first release layer, and a transparent lamination sheet. The transparent lamination sheet has a first side, joined to the first adhesive layer. The transparent lamination sheet includes an identification card back covering portion aligned with the opening and an identification card front covering portion adjacent to and substantially similar in size to the identification card back covering portion, where the identification card front and back covering portions are separable from the transparent lamination sheet and joined at a location substantially aligned with a side edge of the identification card backing region. Further, the present invention relates to methods of creating a laminated card.

25 Claims, 6 Drawing Sheets

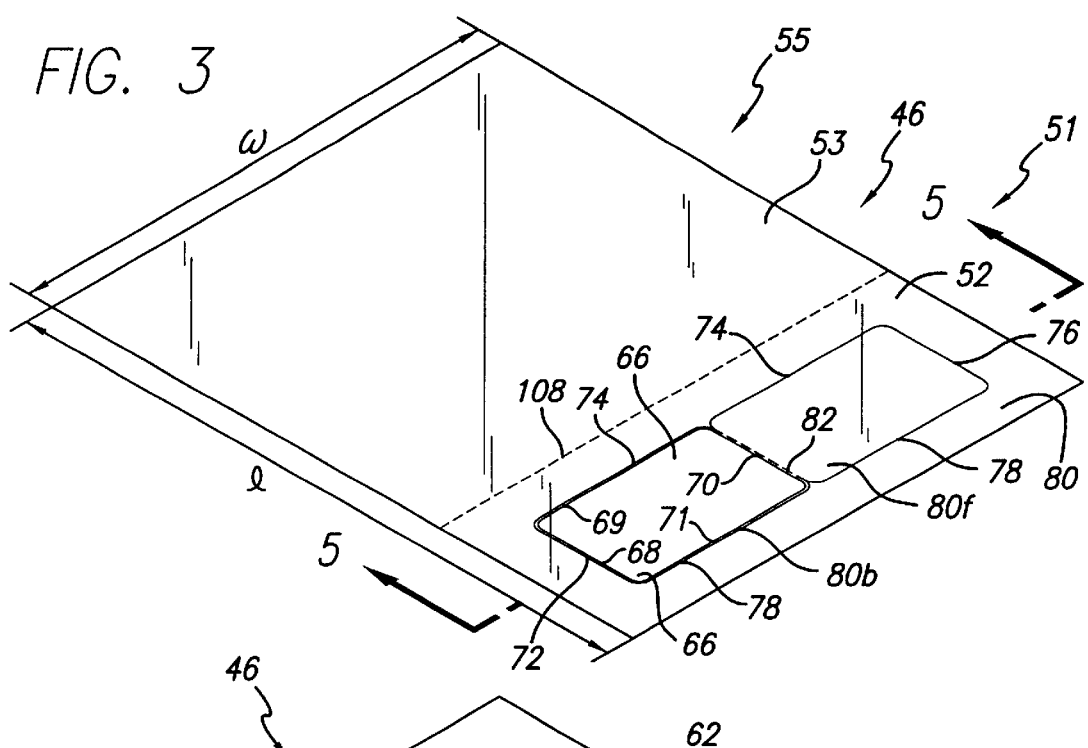
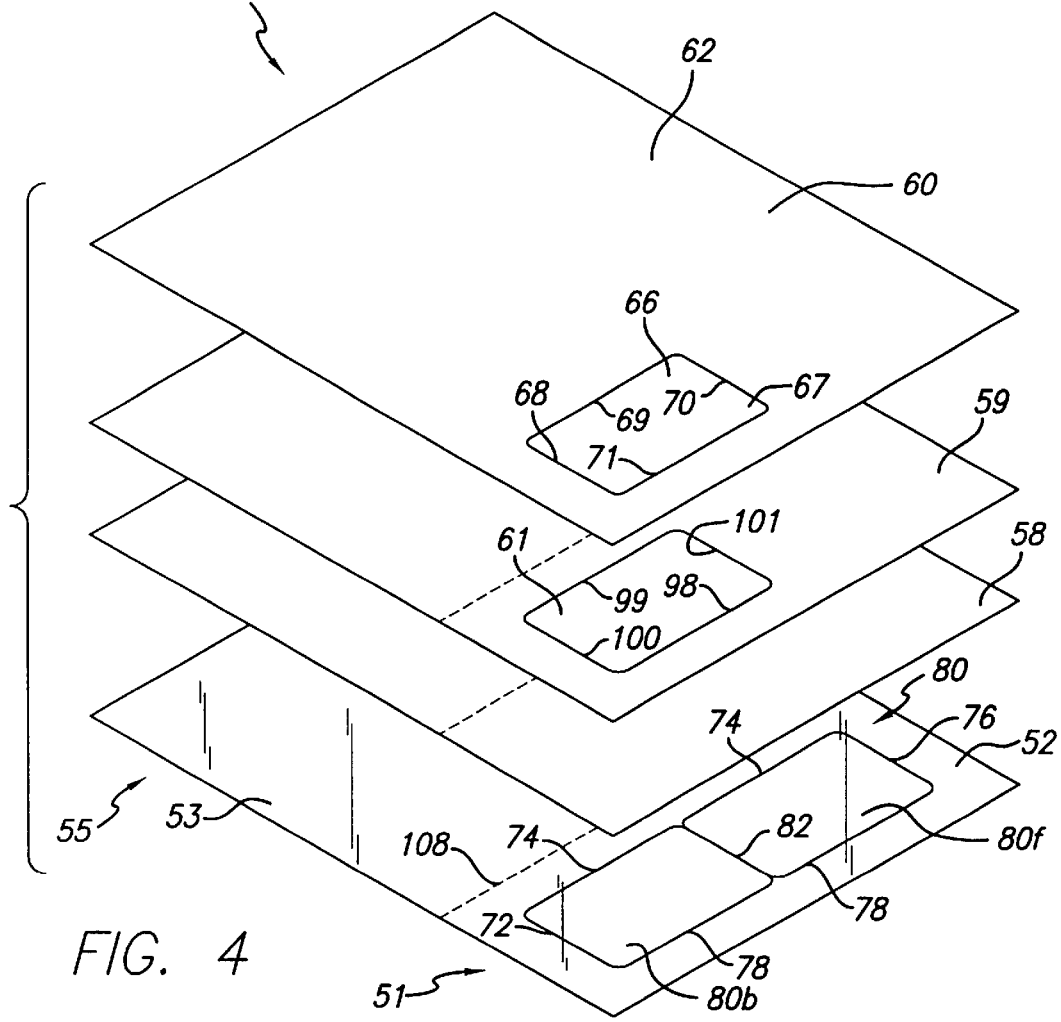

LAMINATED CARD ASSEMBLY

This application is a continuation of U.S. patent application Ser. No. 08/882,966 filed Jun. 26, 1997, now U.S. Pat. No. 6,159,570, granted Dec. 12, 2000, which is a continuation-in-part of U.S. patent application Ser. No. 08/327,981, filed on Oct. 24, 1994, now U.S. Pat. No. 5,662,976, granted Sep. 2, 1996.

FIELD OF THE INVENTION

This invention relates to the field of laminated cards and, in particular, to assemblies for making laminated identification cards.

BACKGROUND OF THE INVENTION

Modern society has found innumerable uses for laminated cards. Perhaps billions of such cards have been made for use as conference name tags, personal identification cards, gift tags, parking passes, playing cards, and so on. Other types of laminated cards include adhesive index tabs and hanging file folder tabs. Indeed, nearly everyone has a laminated card of some sort.

In the not so distant past, simple laminated cards such as club membership cards were made by hand. A secretary would typically insert a card into a typewriter and would type in relevant information such as the member's name and date of admission. After the member had signed the card, the secretary would place the card on a sheet of transparent plastic for forming the lamination assembly. The secretary would then fold the lamination over the card, press the lamination down to seal the card within the lamination, and cut the lamination about the card to remove any excess.

In the 1980's, dot matrix printers came into widespread use. Laminated card assemblies were developed for dot matrix printers to simplify the process of making a laminated card. A typical dot matrix laminated card assembly had tractor feed holes running along either side of the assembly so that it could be fed through the dot matrix printer. A lamination sheet was attached to a card on one side and had a thin backing on the other side. The dot matrix printer would print information on the back of the card, after which the secretary would remove the card from the printer, remove the backing from the lamination, and fold the lamination over the card. The secretary would then cut off the tractor feed holes with scissors, or tear off the strip of holes if perforation lines were provided for that purpose.

FIG. 1 shows a prior art assembly 20 for printing cards in a dot matrix or other type of printer equipped with a tractor feed mechanism. Prior art assembly 20 includes tractor feed strips 22 having tractor feed apertures 24. Tractor feed strips 22 are removable from assembly 20 at lines of perforation 26. The front of the assembly 20 has a layer of lamination 28 which is coated with a pressure sensitive adhesive 30.

FIG. 2 illustrates the back side of the prior art assembly 20 of FIG. 1. FIG. 2 shows a piece of lining material 32 being removed from adhesively backed lamination layer 28. The right hand side of the assembly of FIG. 2 is a card 34 having a printable surface 36. Generally speaking, the assembly is fed through a tractor feed printer, which prints indicia 38 onto printing surface 36. This indicia 38 may include personalized information such as a country club member's name, membership number, and so on. After the assembly has passed through the printer, the user may then sign the card 34, remove liner 32 from lamination layer 28, remove tractor feed strips 22, and fold lamination 28 over at line 40 to cover and adhere to card 34. The user then has a laminated membership card that she or he may carry with him.

In the 1990's, laser printers and ink jet printers replaced dot matrix printers as the printers of choice. Such printers are capable of printing high resolution text and graphics at a high speed with very little noise. Unfortunately, the old tractor feed laminated card assemblies did not work well in laser printers and ink jet printers and photocopiers. There are a number of problems with using the prior art assembly of FIGS. 1 and 2 in a modern day laser printer, ink jet printer, or photocopier. The left hand side 29 of assembly 20 has a thickness that is less than that of right hand side 31. Consequently, there is a sudden thickness change at line 40. This inconsistent thickness will tend to cause jamming in a laser printer, ink jet printer, or photocopier. The friction feed of these types of printers has difficulty grasping hold of such a varying thickness assembly. Additionally, tractor feed apertures 24 will both interfere with the friction feed of these printers as well as provide an opportunity for assembly 20 to become snagged in the interior of the printer. Consequently, the prior art assembly of FIGS. 1 and 2 is inappropriate for use in the types of printers that are most common in offices today.

Thus, there has been a very substantial need to develop an assembly for conveniently printing laminated cards in a laser printer, ink jet printer, photocopier or other printer requiring a substantially flat printing surface.

SUMMARY OF THE INVENTION

It is therefore an object of the present invention to provide an assembly for making laminated cards using a laser printer, ink jet printer or photocopier. It is also an object to provide an assembly having substantially constant thickness and flat upper and lower surfaces so that the assembly will not jam in the complex paper path of laser or ink jet printers, or photographic copiers. It is a further object of the invention to provide an assembly which can yield laminated identification cards.

Accordingly, the present invention relates to a longitudinally extending assembly for creating a display card and a laminated identification card which are suitable for printing on with a laser or ink jet printer, or photocopier. The assembly includes a display card-forming section extending along part of the length of the assembly and an identification card-forming section attached to the display card-forming section and extending along part of the length of the assembly. The identification card-forming section includes a first backing sheet which includes opposed first and second sides and contains an identification card backing region separable from the first backing sheet defined by opposite top and bottom edges joined by opposite side edges within the first backing sheet where the second side is suitable for being printed on. The identification card-forming section further includes a first adhesive layer, a first release layer joined to the first side of the first backing sheet and to the first adhesive layer except at the identification card backing region where there is an opening in the first release layer, and a transparent lamination sheet. The transparent lamination sheet has a first side, joined to the first adhesive layer. The transparent lamination sheet includes an identification card back covering portion aligned with the opening and an identification card front covering portion adjacent to and substantially similar in size to the identification card back covering portion. The identification card front and back covering portions are separable from the transparent lamination sheet and joined at a location substantially aligned with a side edge of the identification card backing region. The laminated identification card is formed by separating the identification card backing region and the identification card front and back covering portions from the assembly, folding the identification card front covering portion over the second side of the identification card backing region, and joining the identification card front covering portion to the identification card backing region with the adhesive layer.

Another aspect of the invention relates to a longitudinally extending assembly having a width and a length for creating laminated cards for printing by a laser printer, ink jet printer, or photocopier. The assembly includes a display card-forming section extending along part of the length of the assembly and an identification card-forming section attached to the display card-forming section and extending along part of the length of the assembly. The identification card-forming section includes a longitudinally extending backing sheet which has a first side and a second side suitable for receiving printing. The backing sheet may also be die cut to provide at least one opening with a card having an extent which completely fills the opening and which is removably positioned in the opening. A lamination sheet is adhesively adhered to a first portion of the first side of the backing sheet. The lamination sheet may also be die cut to provide a removable lamination strip which adheres to and covers one surface of the card and which is also removably adhered to the backing sheet in the area adjacent to the opening. The assembly has a substantially constant thickness across the entire width and length of the assembly to prevent jamming in the laser or ink jet printer.

The backing sheet may have certain areas which have a release coating for convenience in peeling back a portion of the transparent plastic laminating sheet. Alternatively, the backing sheet may be coated across its entire width and length with a release coating. Additionally, the assembly is preferably no more than fifteen mils thick, to prevent jamming in a complex printer sheet feed path. Permanent pressure sensitive adhesive may be employed to secure the cards to and within the lamination. Further, the laminating plastic preferably has an area slightly more than twice that of the card, so that it may cover both sides of the card and seal around the edges thereof.

Another aspect of the invention relates to a method for creating a laminated card from a longitudinally extending assembly. The assembly includes a display card-forming section extending along part of the length of the assembly and an identification card-forming section attached to the display card-forming section and extending along part of the length of the assembly. The identification card-forming section includes a first backing sheet having opposed first and second sides and containing an identification card backing region separable from the first backing sheet. The identification card-forming section is defined by opposite top and bottom edges joined by opposite side edges within the first backing sheet. The second side is suitable for being printed on. This section also includes a first adhesive layer, a first release layer joined to the first side of the first backing sheet and to the first adhesive layer except at the identification card backing region where there is an opening in the first release layer, and a transparent lamination sheet. The transparent lamination sheet has a first side and is joined to the first adhesive layer. The transparent lamination sheet includes an identification card back covering portion aligned with the opening and an identification card front covering portion adjacent to and substantially similar in size to the identification card back covering portion, where the identification card front and back covering portions are separable from the transparent lamination sheet and joined at a location substantially aligned with a side edge of the identification card backing region. The method includes separating the identification card backing region and the identification card front and back covering portions from the assembly, folding the identification card front covering portion over the second side of the identification card backing region, and joining the identification card front covering portion to the identification card backing region with said adhesive layer.

The present invention also encompasses another method for creating a laminated card from an assembly. The assembly has a backing sheet, a card which has been die cut from the backing sheet and which has a printing surface, a lamination sheet adhesively adhered to the backing sheet and to the die cut card, and a lamination strip. The lamination strip has been die cut from the lamination sheet, and it adheres to the card and to the backing sheet adjacent to the die cut card. The backing sheet may have a release coating in at least some of the areas where the lamination adheres to the backing sheet. The assembly may have substantially constant thickness and substantially flat upper and lower surfaces. The method includes removing the card and the lamination strip together from the assembly, with the card being adhered on the side opposite to its printing surface of the lamination strip. The lamination strip may be folded over to cover the printing surface of the card and the lamination strip and the entire card are pressed firmly to seal the lamination strip over the card.

In accordance with various other steps that may be included in the method, the lamination strip may include a line of perforations dividing the lamination member into two symmetrical halves, and the step of folding the lamination strip over may include folding the lamination strip over at the line of perforations. The printing surface of the card is thereby covered by the lamination strip, and the line of perforations assist the user in folding the lamination strip in the proper orientation. A laser printer may perform the step of printing onto the printing surface of the card. The card may have edges, with the lamination strip extending beyond the edges of the card. The step of pressing the lamination strip and the entire card to seal the lamination strip over the card may then include pressing the lamination strip about the edges of the card to seal the lamination strip about the edges of the card.

Other objects, features and advantages will become apparent from a consideration of the following detailed description and from the accompanying drawings.

BRIEF DESCRIPTION OF THE DRAWINGS

FIG. 3 is a front view of an embodiment of the present invention.

FIG. 4 is an exploded perspective view of an embodiment of the present invention.

FIG. 11A is a front view of an embodiment of the present invention, showing the card being partially removed from the assembly. FIG. 11B is a front view of the embodiment of the present invention, showing the card being completely removed from the assembly and the lamination strip being partially removed from the assembly. FIG. 11C shows the card of the present invention removed from the assembly and the lamination layer being folded over the back of the card. FIG. 11D is a cross-sectional view of a finished identification card, taken along line 11D—11D of FIG. 6.

DETAILED DESCRIPTION OF PREFERRED EMBODIMENTS

Figure 1:
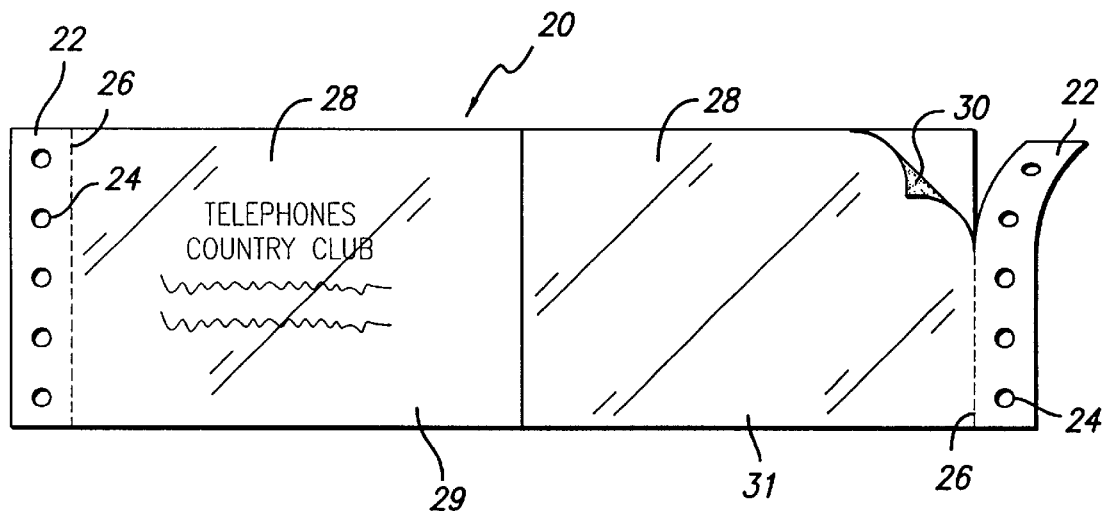
FIG. 1 is a front view of a prior art laminated card assembly for feeding into a printer having a tractor feed apparatus.
Figure 2:
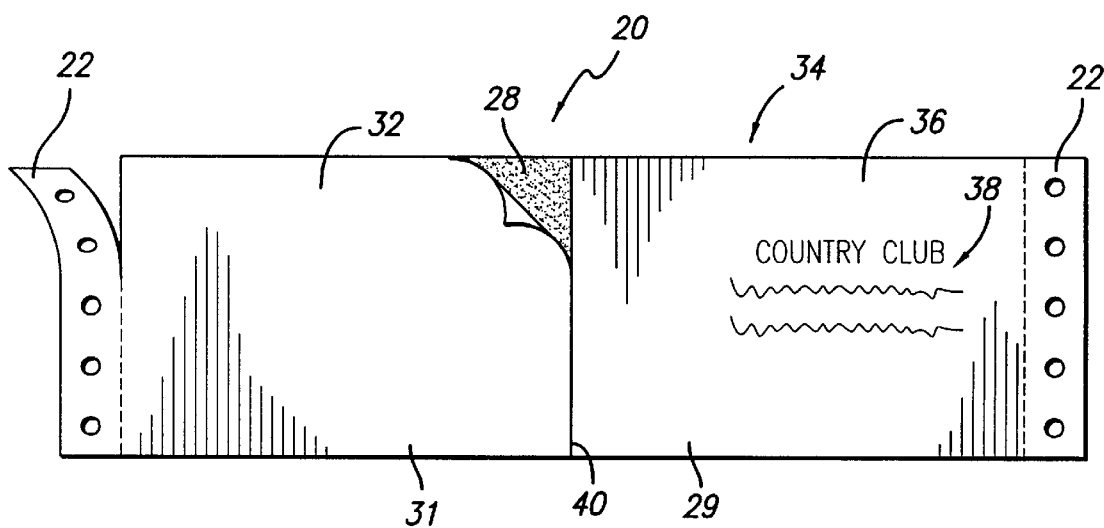
FIG. 2 is a rear view of the prior art assembly of FIG. 1, showing a backing layer partially removed from the front lamination.

Referring more particularly to the Figures, FIG. 3 illustrates a front view of laminated card assembly 46 of the present invention. Assembly 46 extends in a longitudinal direction having a length (l) and a width (w). Assembly 46 includes a display card-forming section 55 and an identification card-forming section 51. Display card-forming section 55 extends along a part of the length (l) of assembly 46. Identification-card forming section 51 is attached to display-card forming section 55 at junction 108 and extends along part of the length (l) of assembly 46. As shown in FIG. 3 and FIG. 4, which is an exploded perspective view of the layers of assembly 46, display card-forming section 55 includes a facing sheet 53. Facing sheet 53 of display card-forming section 55 is aligned with a transparent lamination sheet 52 of identification-card forming section 51 at junction 108. Preferably, junction 108 extends along the entire width (w) of assembly 46. Display-card forming section 55 includes facing sheet 53, adhesive layer 58, release layer 59 and backing sheet 60. Identification-card forming section 51 includes lamination sheet 52, adhesive layer 58, release layer 59, and backing sheet 60.

Preferably, each of lamination sheet 52 and facing sheet 53 has a width which is substantially coextensive with the width of backing sheet 60. Preferably, lamination sheet 52 and facing sheet 53 together have a length which is coextensive with the length of backing sheet 60, where lamination sheet 52 covers a first portion of backing sheet 60 and facing sheet 53 covers a second portion of backing sheet 60. Each of the lengths of lamination sheet 52 and facing sheet 53 can vary, however, the minimum length of lamination sheet 52 is such that approximately the entire extent of identification card backing region 66 is covered by lamination sheet 52, as described below.

Alternatively, the two portions of backing sheet 60 can be made up of two separate sections (not shown). For example, the two sections of backing sheet 60 can be two separate backing sheets. The first section of backing sheet 60 is coextensive with lamination sheet 52, while the second section of backing sheet 60 is coextensive with facing sheet 53. Thus, identification card-forming section 51 and display card forming section 55 have separate sheets making up backing sheet 60 in assembly 46.

Backing sheet 60 which is typically a heavy paper or light cardboard, is die cut at lines 68, 69, 70, and 71 to produce an identification card backing region 66 which is separable from backing sheet 60. Identification card backing region 66 is defined by opposite top and bottom edges, defined by die cuts 69 and 71, which are joined by opposite side edges defined by die cuts 68 and 70. Identification card backing region 66 has a first side (not shown) and a second side 67 opposite the first side suitable for receiving printing.

Figure 6:
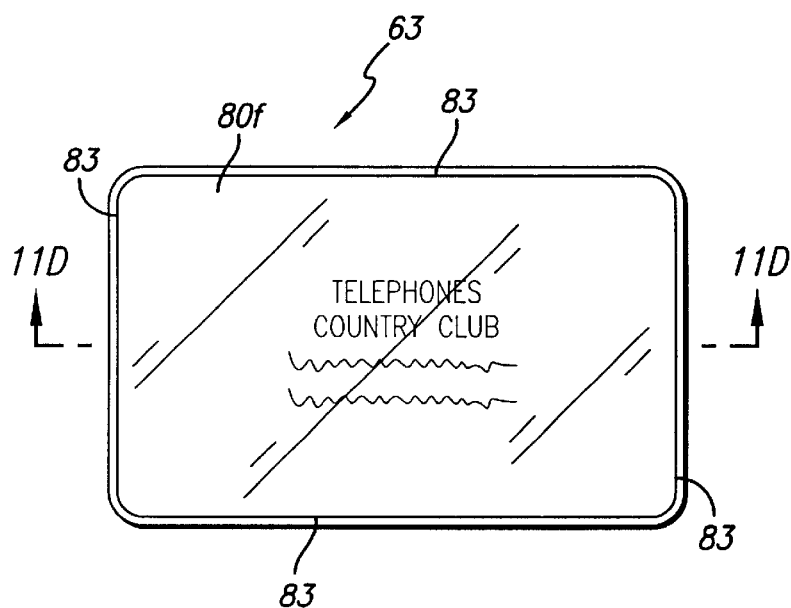
FIG. 6 is a front view of a finished identification card constructed from the assembly of FIG. 3.

Lamination sheet 52 is die cut at 72, 74, 76, and 78 to form a lamination strip 80, which normally remains in the same position on lamination sheet 52 from which it was cut. Lamination strip 80 includes a first portion and a second portion. The first portion is an identification card back covering portion 80b and the second portion is an identification card front covering portion 80f. Identification card back covering portion 80b and identification card front covering portion 80f are joined at a location substantially aligned with a side edge 70 of identification card backing region 66. Identification card front covering portion 80f is adjacent to and substantially similar in size to identification card back covering portion 80b. Identification card back covering portion 80b is aligned with identification card backing region 66. Lamination strip 80 is perforated along a center line 82 so that the lamination strip may be easily folded over at perforation line 82 such that identification card front covering portion 80f may be folded over identification card back covering portion 80b. As can be seen in FIG. 3, the portion of lamination strip 80 defined by die cut 72 and line of perforation 82 is somewhat wider than the corresponding identification backing region 66 card defined by die cuts 68 and 70. The portion of lamination strip 80 defined by die cut lines 78 and 74 are also somewhat wider than the corresponding width of identification card backing region 66 defined by die cuts 69 and 71. Consequently, the finished laminated identification card 63 of FIG. 6 will have lamination edges 83 which extend around the card.

It should be noted that die cuts 72, 74, 76, and 78 extend completely through lamination sheet 52, but do not penetrate into backing sheet 60. Likewise, die cut lines 68, 69, 70, and 71 pass through backing sheet 60, but do not extend into lamination sheet 52. Line of perforation 82 passes through lamination sheet 52, but does not extend into the backing sheet 60.

Lamination sheet 52 and facing sheet 53 are coated with an adhesive layer 58. Preferably, adhesive layer 58 extends such that approximately the entire width and length of both facing sheet 53 and lamination sheet 52 are coated with adhesive layer 58. Identification card-forming section 51 and display card-forming section 55 may contain the same adhesive layer or each section may contain separate adhesive layers 58.

Backing sheet 60 has a first surface 64 (not shown) and a second surface for printing 62 on the opposite side of the backing sheet from the first surface 64. The first surface 64 is covered with a release coating layer 59.

Release coating layer 59 may cover the entire width and length of the first surface 64 of backing sheet 60. Alternatively, release layer 59 covers a portion of first surface 64 of backing sheet 60. Preferably, release coating 59 has an opening 61 shown at the rectangular opening defined between lines 98, 99, 100, and 101 where no release coating is contained. Typically, the dimensions of opening 61 is substantially the same as the dimensions of the identification card backing region 66, and opening 61 is coextensive with identification card backing region 66. Further, opening 61 is substantially aligned with identification card back covering portion 80b of lamination strip 80. Identification card-forming section 51 and display card-forming section 55 may contain the same release layer 59 or each section may contain separate layers 59.

Figure 5:
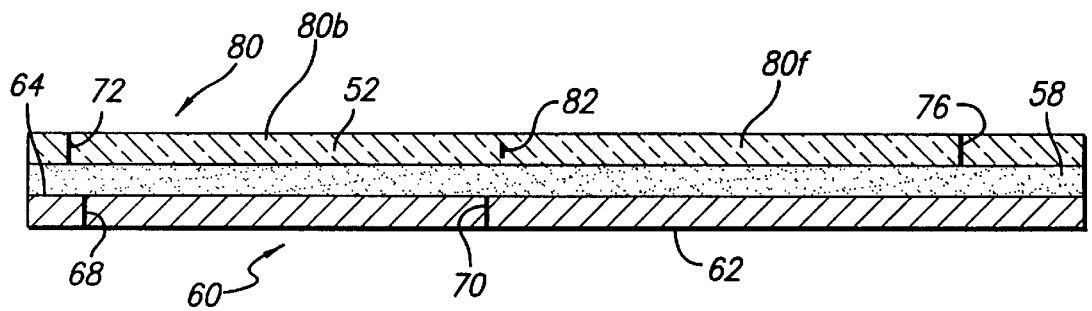
FIG. 5 is a cross-sectional view taken about line 5—5 of FIG. 3.

FIG. 5 is a cross-sectional view taken along line 5—5 which crosses the width of identification card-forming section 51 of FIG. 3. FIG. 5 shows that assembly 46 includes lamination layer 52, which is coated with a pressure sensitive adhesive layer 58. Backing sheet 60 has a surface for printing 62 and a surface on the opposite side of the backing sheet 64 which has a release coating (not shown).

Figure 7:
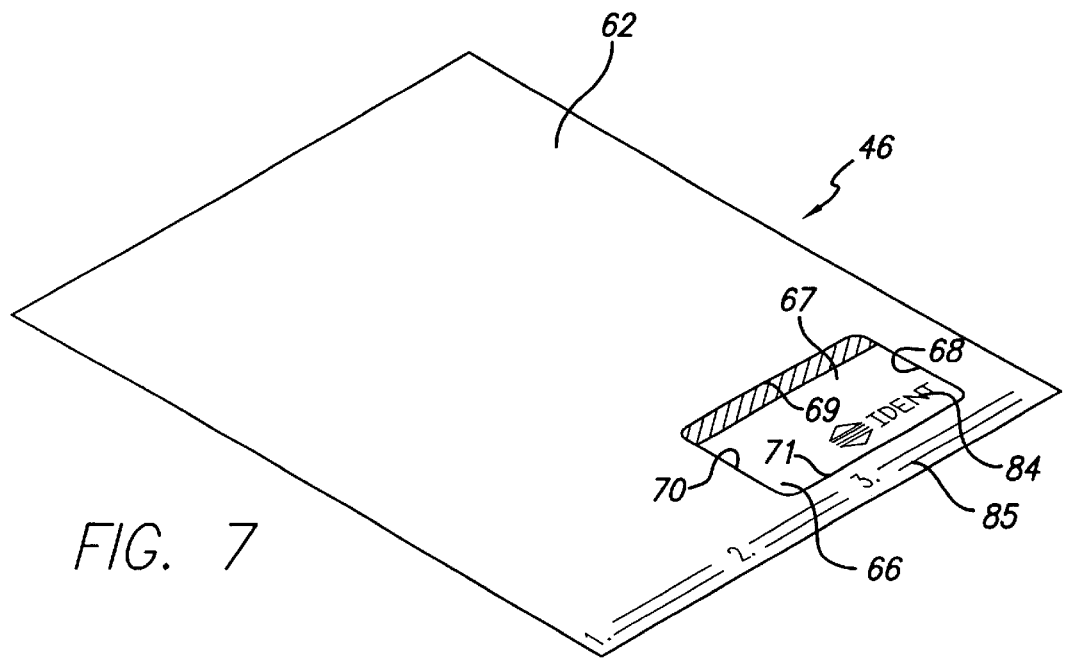
FIG. 7 is a back view of an embodiment of the present invention.

FIG. 7 illustrates the bottom view of assembly 46 corresponding to the front view in FIG. 3. A die cut identification card backing region 66 is shown defined by die cut lines 68, 69, 70, and 71. As discussed in conjunction with FIGS. 3 and 4, the second side of backing sheet 60 has a printable surface 62 which will receive printing from a laser printer, ink jet printer, or photocopier. Identification card backing region 66 includes indicia 84 on second side 67 of identification card backing region 66 which the printer prints as the assembly passes through the printer. Such indicia may include the name of a particular club member, his or her membership number, and various other information that the user desires. A signature blank may be provided for the member to sign once the card is printed (not shown). The first side (not shown) of identification card backing region 66 may also include various preprinted indicia, which is common to all of a particular type of card. In addition, other information may be printed onto a portion of backing sheet 60 other than identification card backing region 66. For example, indicia 85, such as instructions on the use of the card or on how to assemble the card, may be printed below identification card backing region 66 on the backing sheet 60 as shown. Further, printing may be placed on the printing surface 62 of a portion of backing sheet 60 which corresponds to display card-forming section 53.

In addition, as discussed above, additional information can be printed on printing surface 62 of backing sheet 60. Die cuts as discussed above can be utilized in backing sheet 60 around the printed information to produce, for example, a square or rectangular portion for use as a label. Because the entire portion of backing sheet 60 may be coated with a release coating layer 59, other than at opening 61, the square or rectangular portion defined by the die cuts can be removed from backing sheet 60 of assembly 46 for use as a label.

It should be noted that the assembly 46 has substantially constant thickness and substantially flat upper and lower surfaces so that the assembly can pass through a complex paper path of a laser printer, ink jet printer, or photocopier without jamming. It should also be noted that both the lamination sheet and the backing sheet are substantially aperture- and indentation-free to reduce the possibility of jamming.

Figure 8:
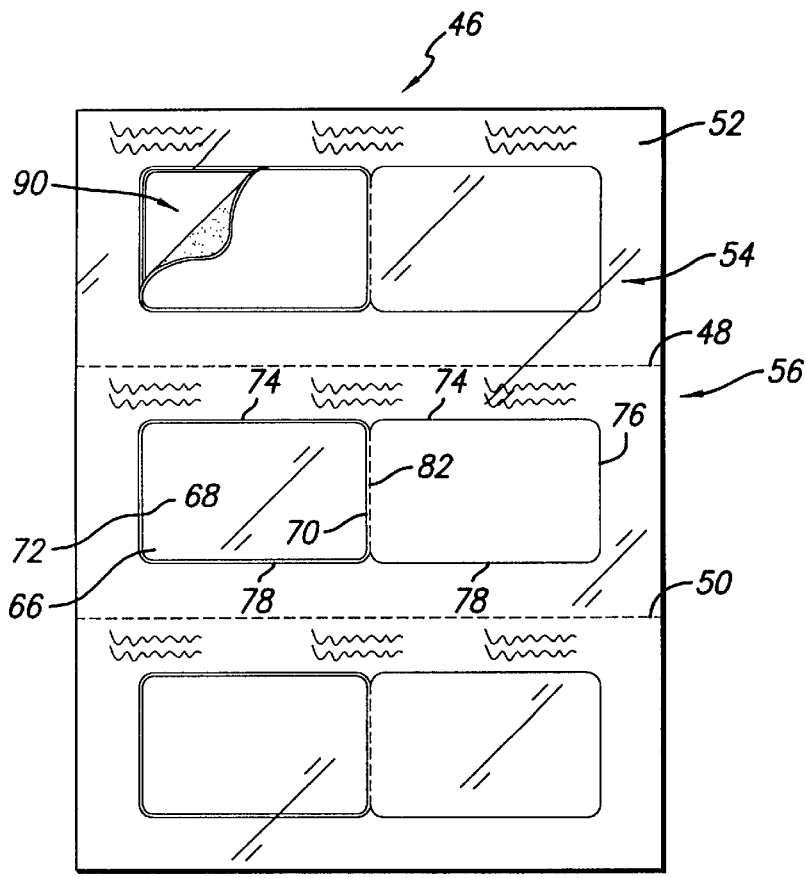
FIG. 8 is a front view of an alternative embodiment of the present invention.
Figure 9:
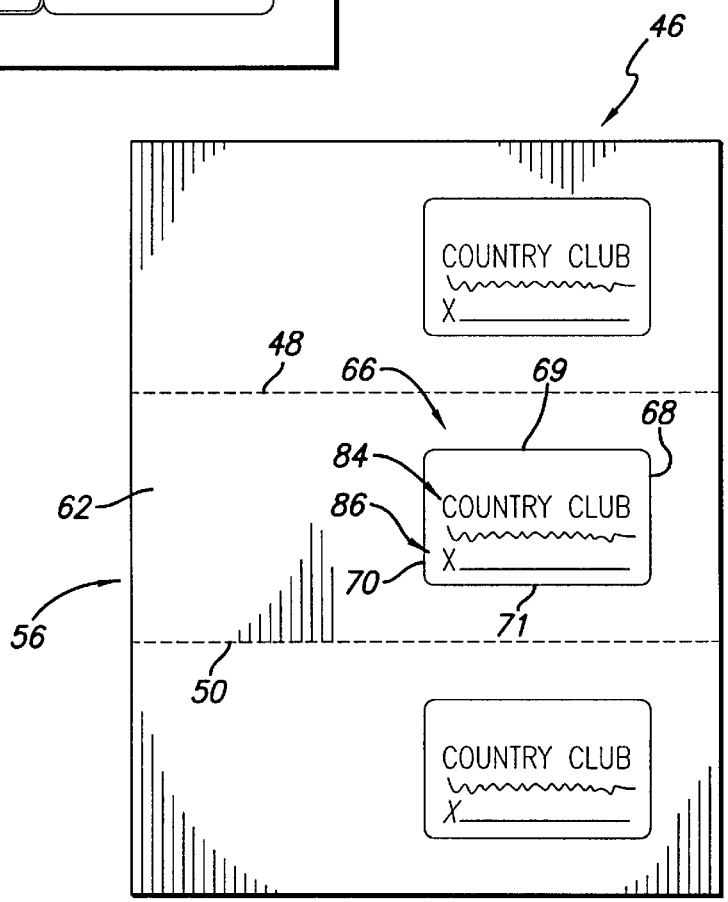
FIG. 9 is the back view of the embodiment shown in FIG. 8.

FIGS. 8 and 9 illustrate an alternative embodiment of a laminated card assembly 46 of the present invention. FIGS. 8 and 9 show that assembly 46 has three separate sections which are separable from one another along transverse lines of microperforations 48 and 50. Assembly 46 includes a top layer having a lamination sheet 52, which is free of apertures or indentations which could interfere with feeding assembly 46 into a laser printer, ink jet printer, or photocopier. Each separable section of the assembly includes an identification card/lamination strip set such as 54.

Figure 10:
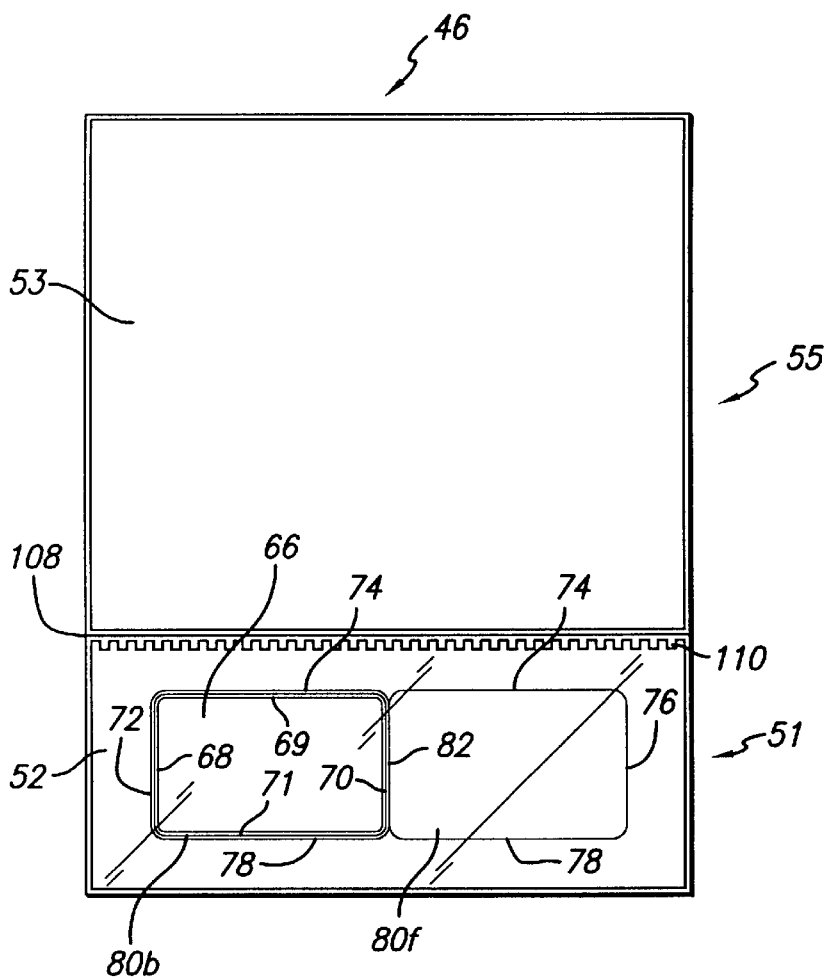
FIG. 10 is a front view of an alternative embodiment of the present invention showing the intermittent placement of adhesive on the assembly.

FIG. 10 shows a front view of the present invention indicating a junction 108 where an edge of lamination sheet 52 and facing sheet 53 meet and, consequently, where display card forming-section 55 and identification card forming-section 51 are attached. Pressure sensitive adhesive layer 58 covers the entire surface of facing sheet 53 and lamination sheet 52 (as shown in FIG. 4). Release layer 59 covers the entire surface of the adhesive layer 58 on facing sheet 53. Further, release layer 59 covers the entire surface of the adhesive layer 59 on lamination sheet 52 except at opening 61 corresponding to indentification card backing region 66 and at a number of voids 110 which contain no release layer 59. Thus, at junction 108, there is intermittent placement of release layer 59 which keeps the edge of lamination sheet 52 firmly attached at junction 108 such that the edge does not lift during laser imaging.

Method Of Creating Laminated Cards From Assembly 46

When printing, the user first feeds assembly 46 into the entry paper path of a printer. The printer then carries assembly 46 along its paper path and prints indicia onto the printing surface of the identification card backing region 66. In addition, instructions or other information may be printed onto other sections of backing sheet 60 of assembly 46 as described above. Once the assembly exits the printer, the user removes the identification card backing region from the identification: card-forming section 51 of assembly 46 and forms a laminated card 63 in a manner illustrated in FIGS. 11A–D.

Figure 11A:
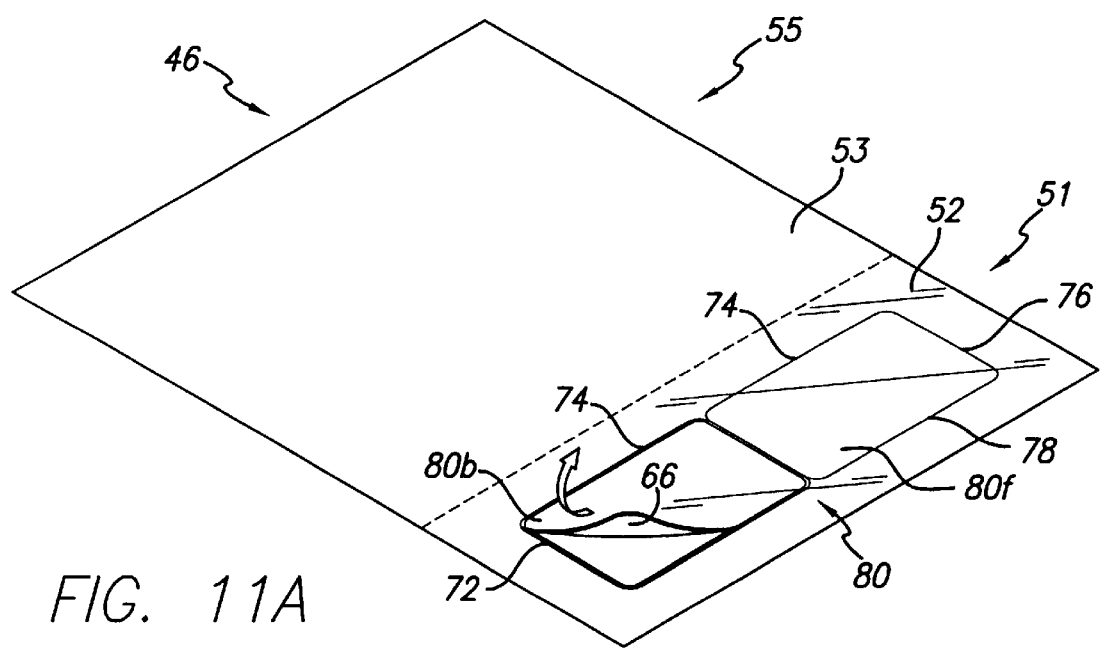
FIGS. 11A–D show the formation of an identification card in accordance with the present invention.
Figure 11B:
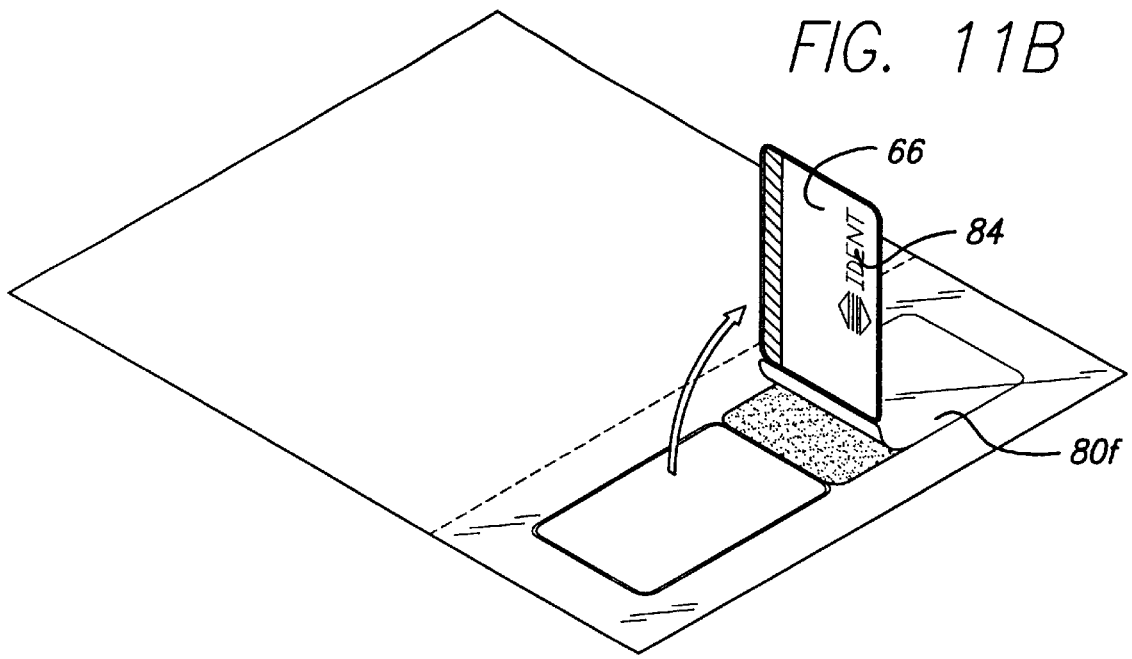

As discussed previously, identification card backing region 66 is adhered on the side opposite to the printing surface 62 of backing sheet 60 to the lamination strip 80. Particularly, identification card back covering portion 80*b* of lamination strip 80 is adhered to the first side of identification card backing region 66 and identification card front covering portion 80*f* is removably adhered to backing sheet 60. As shown in FIGS. 11A–D, the user pushes identification card backing region 66 from backing sheet 60. The die cuts present in backing sheet 60 allow identification card backing region 66 to be separated from identification card forming section 51 of backing sheet 60. Identification card front covering portion 80*f* holds identification card backing region 66 and identification card back covering portion 80*b* in place. Identification card backing region 66 and lamination strip 80 then are removed from the assembly, as shown in FIG. 11B by removing identification card front covering portion 80*f* from backing sheet 60. Die cuts present in the lamination sheet 52 defining lamination strip 80 allow identification card front covering portion 80*f* and identification card back covering portion 80*b* of lamination strip 80 to be removed from backing sheet 60 of assembly 46.

Figure 11C:
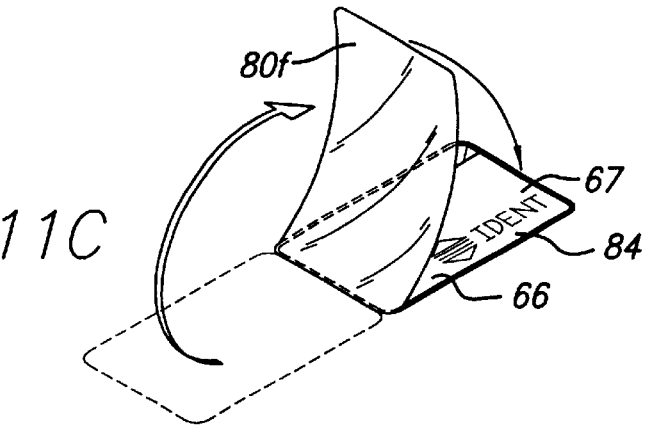
Figure 11D:
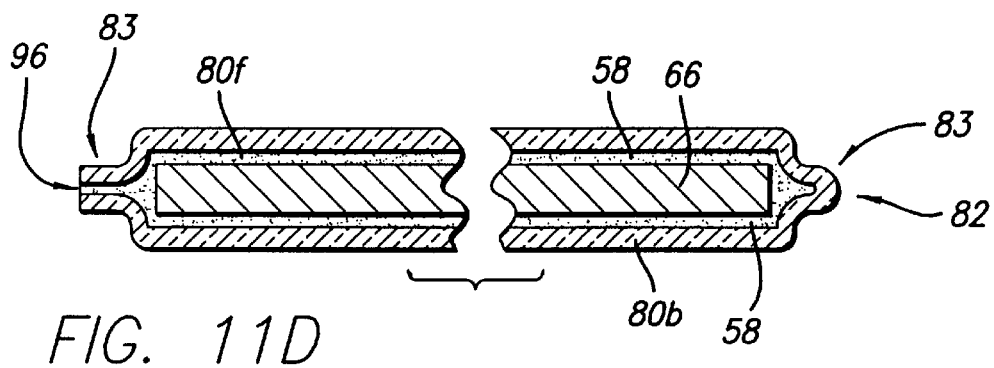

The user may then fold lamination strip 80 over to cover the printing surface of the card as shown in FIG. 11C. Identification backing covering portion 80*b* is adhered to the back of identification card backing region 66. Identification card front covering portion 80*b* is folded over to cover the second surface of identification card backing region 66. If lamination strip 80 includes a line of perforation such as 82, the user may fold the lamination strip 80 over at the line of perforations to cover the printing surface of the card. The user may then press the entire card to seal the lamination strip over the card. The lamination strip may have dimensions greater than those of the card and, in that case, the user may press the entire card to seal the lamination about the edges of the card. It should be noted that after the card has been printed, but before the card has been sealed, the user may also sign his or her name on the card in ink. Alternatively, the user may also attach a photograph or other object onto the printing surface of the card prior to sealing the card.

FIG. 14 is a cross-sectional view of a finished card after the user has sealed it. The finished card includes a first portion which is identification card front covering portion 80*f* of the lamination strip 80, which covers the second side of the card, and a second portion which is identification card back covering portion 80*b* of lamination strip 80, which covers the first side of the card. The edges of the lamination 83 which encompass and surround the identification card backing region 66 are of two varieties. The right hand side of FIG. 14 shows an edge along perforated fold line 82. This edge has a continuous piece of lamination which is simply folded over itself. The other three edges of the laminated card, however, consist of first and second portions of the lamination strip 80*f*, 80*b* coming together at a junction, such as 96. Pressure sensitive adhesive 58 bonds the lamination to identification card backing region 60, and bonds the first and second portions 92, 94 of lamination layer 52 together about the edges of the card.

Materials From Which The Preferred Embodiment Is Constructed

There are five basic material components to the present invention: the lamination layer 52, the facing layer 53, the adhesive layer 58, the release layer 59, and the backing or card layer 60.

The backing sheet itself preferably is paper having a thickness of between 4 and 10 mils, with approximately 6.0 mil being especially desirable. It is noted that the sheets are shown in the drawings thicker than their actual dimensions, the relative thicknesses are not to scale. The backing sheet would usually be formed of fairly heavy paper or light cardboard stock, also known as card stock. The backing sheet may be made from 100 lb. velum card stock, which is available from a wide variety of paper manufacturers and vendors, such as the Simpson Corporation or 80π Litho from Boise Cascade (Boise, Iowa). If desired to include multiple sections, the microperforations consist of cuts which vary in size from 0.0095 to 0.0105 inches and which are separated by ties that vary in size from 0.0045 to 0.0055 inches. Thus, there are between 63 and 69 perforations per inch, with about 66 perforations being an average between the two allowed extremes. More generally, the term "microperforations" indicates that there are more than about 35–40 perforations per inch.

The backing sheet may have a light release coating, such as silicone, to prevent firm adherence of the lamination to the backing layer and to that facilitate peeling the lamination layer off of the backing sheet, as discussed above. The release coating should be extremely thin, in the range of between approximately 0.1 and 0.5 mils. Alternatively, fluorinated or amine-based release coatings, or any other desirable coating may be used.

The lamination sheet is releasably-attached to the backing sheet by a stable, pressure-sensitive adhesive of a type which will not flow at a temperature of a few hundred degrees Fahrenheit. However, it is preferred that the pressure sensitive adhesive will remain stable when subjected to temperatures in the range of up to about 300 to about 400 degrees Fahrenheit to facilitate printing on the cards through laser or other high temperature printing equipment, as discussed above.

The adhesive should be a pressure-sensitive adhesive which does not easily degrade when exposed to ultra-violet light. That is, exposure to ultraviolet light during normal use of the card should not turn the adhesive yellow or cause the adhesive to lose its tackiness. One such adhesive is described in U.S. Pat. No. 5,262,216, which is hereby incorporated by reference. A suitable adhesive is the P60 hot melt adhesive which is available from the Avery Dennison Corporation. Generally speaking, the adhesive should be applied to the lamination layer in a coat of between 0.25 and 2.0 mils thick.

The lamination sheet may be made from any of a number of materials, such as Mylar®, or other suitable transparent sheets which are suitable for laser printing, ink jet printing, or photocopier use. The lamination sheet may have a coating that is receptive to toners and inks so that the finished card may have printing on the surface of the card as well as on the surface of the lamination. Printing on the surface of the lamination would most commonly be by an offset printing process, although it would be possible to print onto the lamination with a laser printer, ink jet printer or photocopiers.

Suitable coated and uncoated Mylar® lamination films are available from DuPont and the Dunmore Corporation. The lamination sheet should be between 1 and 4 mils thick, with 2 mils being especially desirable.

The facing sheet preferably consists of any suitable paper, such as 16 lb. paper, which has a thickness of approximately 2.3 to 2.5 mil.

It should be noted that in selecting the above-mentioned materials, the overall thickness of the assembly should not exceed 15 mils. It has been observed that present day laser printers tend not to work well with assemblies having thicknesses greater than 15 mils. However, if future models of laser printers are developed to be capable of accepting assemblies having a thickness greater than 15 mils, then the maximum overall assembly thickness may be increased.

Additionally, the lamination and backing layer materials may be substantially flat so that the overall assembly has substantially constant thickness throughout its entire width and length, thereby reducing the likelihood that the assembly will jam in the complex paper path of a modern printer. The backing and lamination layers may also be free from apertures, tractor-feed holes, depressions and the like other than die cuts, perforations and other very minor discontinuities.

For purposes of clarity, it should be understood that the term "laser printer" refers not only to laser printers as such, but also to ink jet printers, photocopiers, and any other printer which will jam when a sheet having a non-constant thickness is input into the printer. The present invention is further intended to be used in conjunction with future types of printers not yet developed or not presently in widespread use. It should also be understood that the word "cut" refers not only to die cutting, but also to any other type of cutting, as well as to perforations. It should also be understood that the term "microperforations" is intended to encompass all constructions in which the edges of the backing sheet are smooth and substantially free of coarse irregularities following separation.

Exemplary dimensions of one embodiment are as follows. These dimensions are for purposes of illustration only and not of limitation. A full assembly may be 8½ inches wide by 11 inches long, with a thickness of between approximately 5.35 mils to 15 mils. An individual card may be between 3¼ inches long by 2 inches wide. A lamination strip may be 6¾ inches long and 2⅛ inches wide. The distance from the top of the assembly to the top of the uppermost lamination strip may be 1⅝ inches. The distance from the bottom of the assembly to the bottom of the lower most lamination strip may be ¼ inch. The distance from the left hand edge of the assembly to the left hand edges of the lamination strips may be ⁷⁄₁₆ inch. The distance from the right hand edge of the assembly to the right hand edges of the lamination strips may be 1⅜ inches. The lamination strips may be vertically spaced from one another so that the bottom of an upper strip is 1½ inches away from the top of a lower strip.

A wide range of other dimensions are possible. For instance, the overall assembly dimensions may be 3 to 4¼ inches wide by 11 inches long. Alternatively, an 8½ inches wide by 11 inches long assembly may be divided into equal separable sections of 3⅔ inches long each. As discussed previously, each section has one or more card/lamination strip sets. Two lines of microperforations run across the entire width of the assembly to separate the sections. Alternatively, such lines of microperforations could run vertically along the length of the assembly to make vertical separable sections.

Various other dimensions and card shapes are also imaginable. For instance, as new printers are developed that can accommodate very narrow sheets, the present assemblies may be made correspondingly more narrow. Similarly, future printers may accommodate sheets that are more than 8½ inches wide, and the present assemblies may be made wider than 8½ inches within the scope of the invention.

In conclusion, it is to be understood that the foregoing detailed description and the accompanying drawings relate to the presently preferred illustrative embodiments of the invention. However, various changes may be made without departing from the spirit and scope of the invention. Thus, by way of example and not of limitation.

The present invention is not limited to any one application. The present invention encompasses name tags for conferences, gift tags, parking passes, and any other laminated card. After a card has been printed, a user may glue or otherwise attach a photograph to the printing surface of the card. The user can then fold the lamination strip over the card and photograph to create a photo identification card. It is further noted that although fairly heavy paper or card stock is preferred, the term "card" as used herein could refer to normal sheets of paper employed to form laminated assemblies, as disclosed herein.

The present invention also encompasses cards which have shapes other than a standard rectangular card. For instance, the present invention includes an assembly for making laminated cards for rotary address files such as those available from the Rolodex Corporation of Secaucus, N.J. One problem with non-laminated cards for rotary address files is that they easily become dirty and worn. However, the present invention provides a system for creating long-lasting rotary address cards that will not deteriorate with normal use.

The present invention also encompasses other laminated cards, such as custom-designed playing cards which a user designs on a personal computer using clip art images and text. Accordingly, the present invention is not limited to the arrangement shown in the drawings and described hereinabove.

What is claimed:

1. An assembly for creating a laminated structure for printing by a laser or inkjet printer or photocopier, the assembly having a width and a length comprising:
    a backing sheet having
        a first surface, the first surface being for receive a printing,
        a second surface,
        a removable portion having a first surface and a second surface, and
        a section for receiving the removable portion;
    a substantially transparent plastic lamination sheet adhered to the second surface of the backing sheet, the lamination sheet including a cut to form a lamination member removable from the lamination sheet;
    the removable lamination member having a first portion adhering to and covering the second surface of the removable portion of the backing sheet, and a second portion of the removable lamination member releasably adhered to the backing sheet;
    the assembly having a substantially constant thickness across the width and length of the assembly so as to prevent jamming in a laser or inkjet printer or photocopier;
    the removable portion of the backing sheet being capable of being pushed through the cut in the lamination sheet thereby separating the first portion of the removable lamination member from the lamination sheet; and
    the second portion of the removable lamination member being movable from the lamination sheet and being foldable onto the first surface of the removable portion of the backing sheet thereby to form a removable portion which is laminated on both surfaces by the transparent lamination member.

2. An assembly as defined in claim 1 further comprising printed indicia on said first surface of the removable portion of said backing sheet.

3. An assembly for creating a laminated structure for printing by a laser or inkjet printer or photocopier, the assembly having a width and a length comprising:
    a backing sheet having
        a first surface, the first surface being for receive a printing,
        a second surface,
        a removable portion having a first surface and a second surface, and
        a section for receiving the removable portion;
    the removable portion defining a width and a length and wherein the length is at least about twice the extent of the width;
    a substantially transparent plastic lamination sheet adhered to the second surface of the backing sheet, the lamination sheet including a cut to form a lamination member removable from the lamination sheet;
    the removable lamination member having a first portion adhering to and covering the second surface of the removable portion, and a second portion of the removable lamination member releasably adhered to the backing sheet;
    the assembly having a substantially constant thickness across the width and length of the assembly so as to prevent jamming in a laser or inkjet printer or photocopier;
    the removable portion of the backing sheet being capable of being pushed through the cut in the lamination sheet thereby separating the first portion of the removable lamination member from the lamination sheet; and
    the second portion of the removable lamination member being movable from the lamination sheet and being foldable onto the first surface of the removable portion of the backing sheet thereby to form a removable portion which is laminated on both surfaces by the transparent lamination member.

4. An assembly for creating a laminated structure for printing by a laser or inkjet printer or photocopier, the assembly having a width and a length comprising:
    a backing sheet having
        a first surface, the first surface being for receive a printing,
        a second surface, a removable portion having a first surface and a second surface, and a section for receiving the removable portion;

a substantially transparent plastic lamination sheet adhered to the second surface of the backing sheet, the lamination sheet including a cut to form a lamination member removable from the lamination sheet;

the removable lamination member having a first portion adhering to and covering the second surface of the removable portion, and a second portion of the removable lamination member being releasably adhered to the backing sheet, and the first and second portions defining a width and a length and wherein the length is at least about twice the extent of the width;

the assembly having a substantially constant thickness across the width and length of the assembly so as to prevent jamming in a laser or inkjet printer or photocopier;

the removable portion of the backing sheet being capable of being pushed through the cut in the lamination sheet thereby moving the first portion of the removable lamination member from the lamination sheet; and the second portion of the removable lamination member being movable from the lamination sheet and being foldable onto the first surface of the removable portion of the backing sheet thereby to form a removable portion which is laminated on both surfaces by the transparent lamination member.

5. An assembly for creating a laminated structure for printing by a laser or inkjet printer or photocopier, the assembly having a width and a length comprising:

a backing sheet having a first surface, the first surface being for receive a printing, a second surface, a removable portion having a first surface and a second surface, and a section for receiving the removable portion;

a substantially transparent plastic lamination sheet adhered to the second surface of the backing sheet, the lamination sheet including a cut to form a lamination member removable from the lamination sheet;

the removable lamination member having a first portion adhering to the second surface of the removable portion, and a second portion of the removable lamination member being releasably adhered to the backing sheet;

the assembly having a substantially constant thickness across the width and length of the assembly so as to prevent jamming in a laser or inkjet printer or photocopier;

the removable portion of the backing sheet being separate from the lamination sheet thereby separating the first portion of the lamination removable member from the lamination sheet; and the second portion of the removable lamination member being separated from the lamination sheet and being foldable onto the first surface of the removable portion of the backing sheet, and to thereby adhere to the first surface thereby to form a removable portion which is laminated on both surfaces by the transparent lamination member.

6. An assembly as claimed in claim 1 wherein the lamination sheet is substantially coextensive with the backing sheet.

7. An assembly for creating a laminated structure for printing by a laser or inkjet printer or photocopier, the assembly comprising:

a backing sheet comprising a first side, a second side which has a printing surface, and an opening;

a part of said backing sheet, said part substantially filling said opening and being releasably positioned in said opening;

a substantially transparent plastic lamination sheet adhered to said first side of said backing sheet, said lamination sheet being substantially coextensive with said backing sheet;

said lamination sheet being cut to form a lamination member;

said lamination member having an extent somewhat more than twice the extent of said part of said backing sheet;

said lamination member comprising a removable portion which adheres to and covers one surface of said part of said backing sheet and which releasably adheres to said backing sheet adjacent to said opening;

wherein the assembly has a substantially constant thickness across the width and length of the assembly so as to prevent jamming in a laser or inkjet printer or photocopier; and whereby said part of said backing sheet may be pushed through said lamination sheet, carrying said lamination member with it, and the lamination member may be folded over to encapsulate said part of said backing sheet thereby to form a removable portion which is laminated on both surfaces.

8. An assembly for a laminated identification element, wherein the identification element includes a portion suitable for printing on with a laser or ink jet printer, or photocopier, the assembly comprising:

an identification element first portion extending along part of the length of said assembly, and part of the width of the assembly;

a backing sheet including opposed first and second surfaces and containing the first identification first portion separable from the backing sheet, the portion being defined by opposite top and bottom edges joined by opposite side edges within said backing sheet, wherein the first surface is suitable for receiving printing;

an adhesive layer;

a release coating on the second surface of the backing sheet; and a transparent lamination sheet having a first surface bearing the adhesive layer, the transparent lamination sheet being for forming a lamination element including a back covering portion for alignment with the opening and a front covering portion adjacent to and at least equal in size to the back covering portion;

the lamination element front and back covering portions being separable from said transparent lamination sheet and said front and back covering portions being joined at a location substantially aligned with an edge of the identification element; and said assembly being of substantially uniform thickness;

whereby the laminated identification element is formed by separating the identification element and the lamination element covering portions from the assembly, folding the lamination element front covering portion over the front of the identification element, and joining the front covering portion to the back covering portion around the periphery of the identification element with adhesive from the adhesive layer.

9. The assembly according to claim 8, wherein there are multiple laminated identification elements formed on a single sheet.

10. The assembly according to claim 9, wherein said backing sheet is coplanar with the lamination sheet.

11. The assembly according to claim 8, wherein the backing sheet contains die cuts to facilitate separation of said removable portion from the backing sheet.

12. The assembly according to claim 11, wherein the lamination sheet contains perforations at locations substantially aligned with a side edge of the identification element to facilitate folding.

13. A longitudinally extending assembly having a width and a length for printing by a laser or ink jet printer or photocopier, said assembly comprising:
   an identification element extending along a part of the width and part of the length of said assembly;
   a backing sheet having a first side, a second side suitable for receiving printing, and an opening;
   the identification element having an extent, said member substantially filling said opening;
   a substantially coextensively extending substantially transparent plastic lamination sheet adhered to a first portion of said first surface of the backing sheet, the lamination sheet having a removable portion in extent approximately equal to at least twice the extent of said identification element; and
   wherein said assembly has a substantially constant thickness across the entire width and length of the assembly to prevent jamming in the laser or ink jet printer or photocopier.

14. The assembly according to claim 13, wherein said backing sheet has a release coating on selected portions of said first side of said backing sheet.

15. The assembly according to claim 13, wherein said backing sheet has a void of release coating on said first portion of said backing sheet, wherein said void is coextensive with said identification element.

16. The assembly according to claim 13, wherein the removable portion of the lamination sheet has an extent greater than about twice the extent of said identification element.

17. The assembly according to claim 13, wherein the lamination element is releasably adhered to a portion of the first side of the backing sheet.

18. The assembly according to claim 13, wherein one face of the backing sheet by a coating of pressure sensitive adhesive.

19. The assembly according to claim 13, wherein said pressure sensitive adhesive is located only on portions of said first side of the lamination sheet and said first side of the backing sheet.

20. A laminated structure formed from the assembly as claimed in claim 1.

21. A laminated structure formed from the assembly as claimed in claim 3.

22. A laminated structure formed from the assembly as claimed in claim 4.

23. An identification element formed from the assembly as claimed in claim 8.

24. An identification element formed from the assembly as claimed in claim 13.

25. An assembly for creating a laminated structure for printing by a laser or inkjet printer or photocopier, the assembly having a width and a length comprising:
   a backing sheet having
      a first surface, the first surface being for receive a printing,
      a second surface,
      a removable portion having a first surface and a second surface, and
      a section for receiving the removable portion;
   a substantially transparent plastic lamination sheet adhered to the second surface of the backing sheet, the lamination sheet including a cut to form a lamination member removable from the lamination sheet;
   the removable lamination member having a first portion adhering to the second surface of the removable portion, and a second portion of the removable lamination member being releasably adhered to the backing sheet;
   the assembly having a substantially constant thickness across the width and length of the assembly so as to prevent jamming in a laser or inkjet printer or photocopier;
   said assembly being approximately 8½ inches wide and 11 inches long, and less than 15 mils thick;
   the removable portion of the backing sheet being separate from the lamination sheet thereby separating the first portion of the lamination removable member from the lamination sheet;
   the second portion of the removable lamination member being separated from the lamination sheet and being foldable onto the first surface of the removable portion of the backing sheet, and to thereby adhere to the first surface thereby to form a removable portion which is laminated on both surfaces by the transparent lamination member.

* * * * *